United States Patent [19]
Nobutani

[11] Patent Number: 4,797,873
[45] Date of Patent: Jan. 10, 1989

[54] DISK CRAMP APPARATUS

[75] Inventor: Toshiyuki Nobutani, Tokyo, Japan

[73] Assignee: Canon Kabushiki Kaisha, Tokyo, Japan

[21] Appl. No.: 41,222

[22] Filed: Apr. 22, 1987

[30] Foreign Application Priority Data
Apr. 24, 1986 [JP] Japan ............... 61-093313

[51] Int. Cl.⁴ .............................. G11B 17/02
[52] U.S. Cl. ................ 369/270; 360/99.08; 360/99.12
[58] Field of Search .............. 369/270, 75.2, 77.2; 360/87, 99, 86

[56] References Cited
U.S. PATENT DOCUMENTS
4,232,870 11/1980 Iemenschot .............. 369/270

FOREIGN PATENT DOCUMENTS
55-4731 1/1987 Japan.

Primary Examiner—Steven L. Stephan
Attorney, Agent, or Firm—Fitzpatrick, Cella, Harper & Scinto

[57] ABSTRACT

This invention is constructed so that when a flexible disk is cramped to a hub of a spindle, a possible miscramping of the disk is prevented. To this end, a rotating means is provided to apply torque to the spindle hub in connection with the cramping before the cramping is completed. Thus possible damage to the disk due to miscramping is prevented to prolong the service life of the disk.

8 Claims, 3 Drawing Sheets

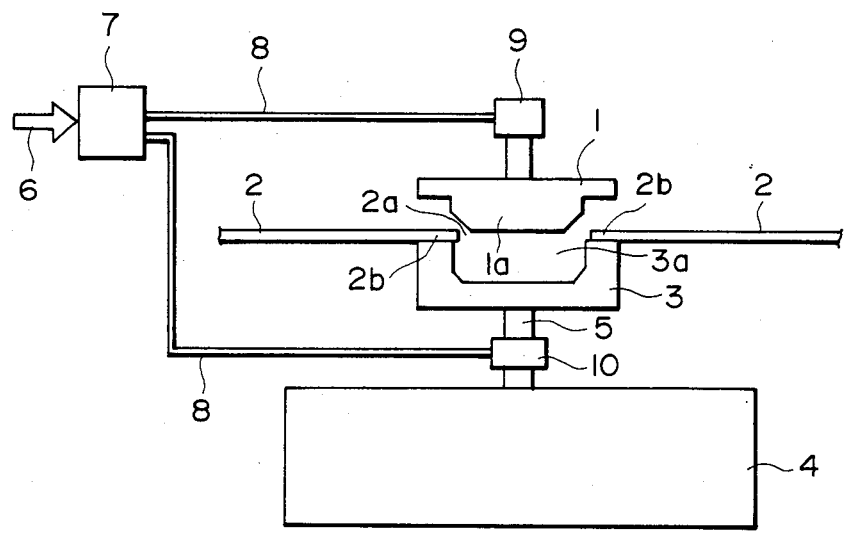
F I G. 1

DISK CRAMP APPARATUS

BACKGROUND OF THE INVENTION

1. Field of the Invention

This invention relates to a disk cramp apparatus which rotates a spindle hub by holding a disk (media) between the spindle hub and a collet to access the disk.

2. Related Background Art

As shown in FIG. 4, in a conventional disk cramp apparatus of this type, a disk 2 is inserted between a collet 1 and a spindle hub 3 and collet 1 is then fitted into spindle hub 3 to hold the disk therebetween.

However, disk 2 is not always positioned concentric with the spindle hub. For example, as shown by 2b in FIG. 5, disk 2 may be bent and held between collet 1 and spindle hub 3. The accuracy of a central opening in disk 2, damaged due to such miscramping, is very low to greatly reduce the reliability of data storage.

In order to prevent such miscramping, a device has been proposed which performs a cramp operation while rotating the spindle hub when power to the device has been turned on in advance. In this case, turn on of power in advance is a precondition, so that if cramping is performed when power has not been turned on due to the operator's carelessness and/or lack of understanding, miscramping similar to the above would occur.

SUMMARY OF THE INVENTION

A first object of this invention is to prevent miscramping of a disk by cramping the disk at a proper position in a spindle hub.

A second object of this invention is to prevent possible damage to a disk due to miscramping, in order to prolong the service life of the disk.

A third object of this invention is to realize the prevention of miscramping using a mechanical means which has a simple structure and which does not require turn on of power in advance.

BRIEF DESCRIPTION OF THE DRAWINGS

FIG. 1 is a rough schematic of one embodiment of this invention;

DESCRIPTION OF THE PREFERRED EMBODIMENTS

Figure 2:
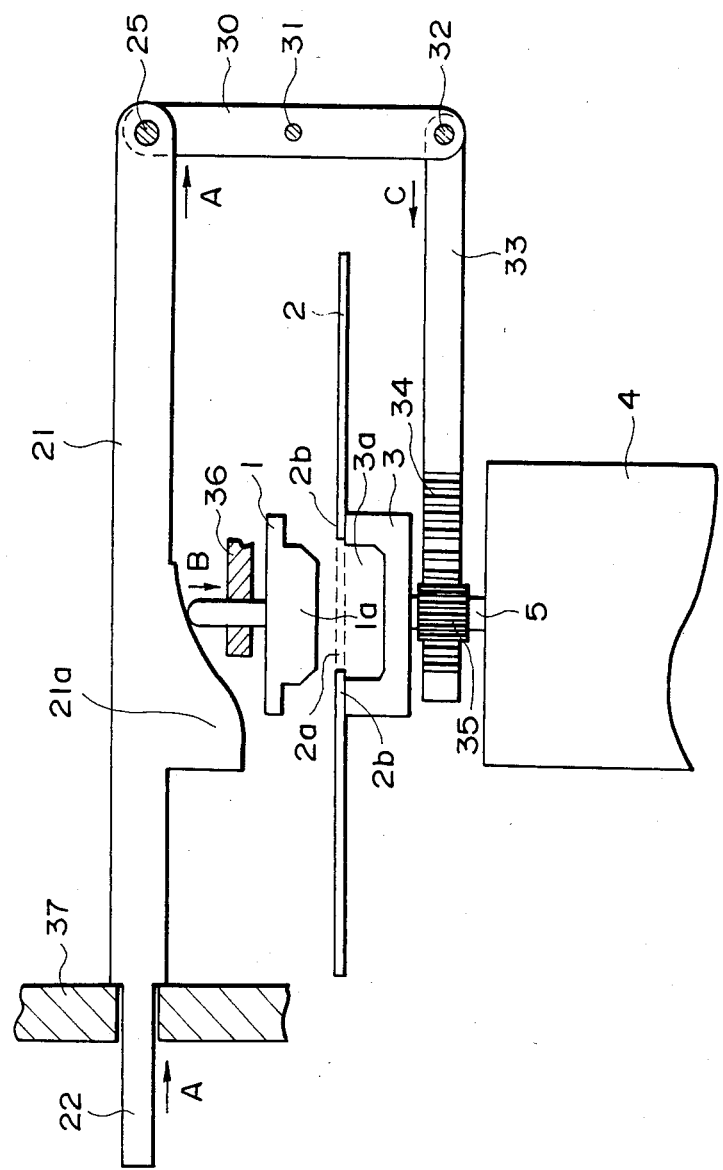
FIG. 2 is a detailed schematic of a cramp section of FIG. 1.

A disk cramp apparatus according to this invention includes manually operated means for pressing (fitting) a collet against (into) a spindle hub after a disk is inserted between the spindle hub and the collet, and means for rotating the spindle hub in interlock with the pressing by the manually operated means.

In the above structure, by rotating the spindle hub, utilizing the manual hold of the disk, it is ensured that miscramping is prevented without the need for turning on of power in advance.

An embodiment of this invention will now be described in detail with reference to the drawings.

FIG. 1 is a rough schematic of one embodiment of this invention. In FIG. 1, a collet 1 cramps a magnetic disk rotatably and has a convexity in the form of a subtantially truncated cone 1a. Reference numeral 2 denotes a magnetic disk having an opening 2a. Reference numeral 3 denotes a spindle hub having a recess 3a. Reference numeral 4 denotes a motor which rotates the spindle hub. Reference numeral 5 denotes a drive shaft of motor 4 fixed to the spindle hub. Reference numeral 6 denotes an external force which usually occurs by pressing a button, pressing a lever, closing a door or the like after the disk is inserted. Reference numeral 7 denotes a distributor which distributes the external force 6 to both of transducer 9 and 10 and changes the form of movement as needed. Reference numeral 8 denotes a transmission system which transmits the distributed external force to the transducers 9 and 10. Transducer 9 transduces the transmitted external force to an up-down movement as viewed in FIG. 1. Transducer 10 transduces the transmitted external force to a rotational motion.

FIG. 2 illustrates a specific example of external force transmission through distributor 7 and transducers 9 and 10 by pressing a button.

In FIG. 2, a collet moving bar 21 swings a swing bar 30, disposed swingably at a pin 31 fixed to a magnetic disk housing (not shown), by pushing a disk setting button 22, protruding from an outer panel 37, in the direction of the arrow A, as shown. By pushing disk setting button 22, collet 1 is moved in the direction of the arrow B by the action of a collet moving cam 21a provided on bar 21. This causes the collet convexity to be fitted into disk opening 2a and hub recess 3a, and magnetic disk 2 is held at its portion 2b in the vicinity of the outer periphery of opening 2a.

On the other hand, as bar 30 is swung, spindle rotating bar 33 and hence a rack 34 provided on bar 33 are moved in the direction of the arrow C. Rack 34 meshes with a ring gear 35 fixed to the drive shaft 5 of motor 4 so that as bar 33 is moved, motor drive shaft 5 is rotated, thereby rotating spindle hub 3 and magnetic disk 2.

Figure 3:
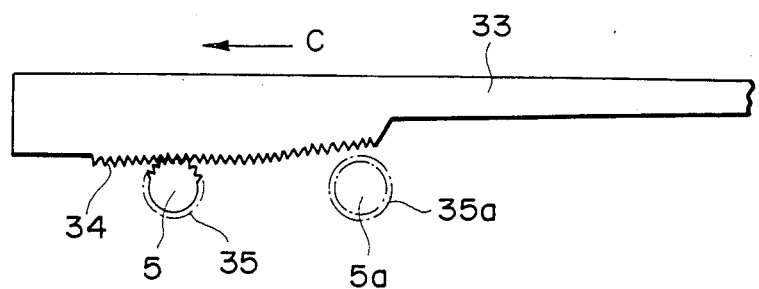
FIG. 3 is a plan view of a rack and ring gear of FIG. 2, showing the positional relationship therebetween.
Figure 4:
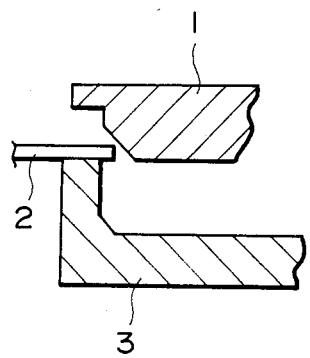
FIG. 4 is a cross-sectional view of the essential portion of a cramp apparatus, showing the cramping of general magnetic disk.
Figure 5:
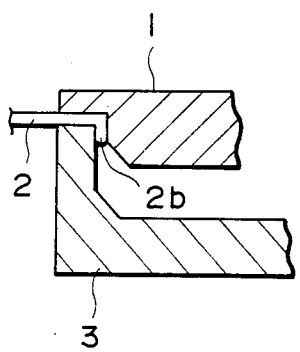
FIG. 5 is a cross-sectional view of the essential portion of a conventional cramp apparatus, showing a miscramped disk.

Rack 34 and ring gear 35 have the positional relationship shown in FIG. 3 (plan view) as viewed in the direction of the arrow B. Initially (before the cramp operation) the elements 34 and 35 are at the actual position shown and mesh with each other. When disk setting button 22 is now pressed in the direction of the arrow A in FIG. 2, spindle rotating bar 33 is moved in the direction of the arrow C in FIG. 3, thereby rotating drive shaft 5. When spindle rotating bar 33 is further moved in the direction of the arrow C, and the cramping of the magnetic disk is completed, drive shaft 5 and ring gear 35 take the positions (5a, 35a) shown by the dot-dashed line in FIG. 3, so that ring gear 35 is disengaged from rack 34. Thereafter, drive shaft 5 is rotated following the rotation of motor 4.

As described above, according to this embodiment, only manual push of disk setting button 22 is required to result in rotation of spindle hub 3 while cramping a magnetic disk.

The above structure may be modified so that ring gear 35 is mounted on drive shaft 5 via an one-way clutch so that rack 34 meshes with ring gear 35 at all times, the clutch is disengaged from the drive shaft during high speed rotation of same by motor 4 so as not to be an obstacle to rotation. By such construction, motor 4 can rotate spindle hub 3 when power is turned on while rack 34 and ring gear 35 can rotate spindle hub 3 when power is off.

While the example involving push of a button has been described in the above, it may be arranged that a similar operation may be performed by operating a lever or closing a door.

As described above, addition of transducer 10 serves to rotate the spindle hub although no power is turned on when a disk is inserted and pressed, so that miscramping is avoided, thereby preventing damage to the central opening in the disk and reduction of the reliability of data storage when the disk is inserted.

As described above, according to this invention, a disk cramp apparatus is provided which eliminates the miscramping of a disk and provides high reliability of data storage.

What is claimed is:

1. A disk cramp apparatus comprising:
   (a) means for holding a disk, said holding means including a first half for rotating said disk and a second half for pressing said disk rotatably against said first half of said holding means;
   (b) means for moving said second half of said holding means from a disk non-hold position to a disk hold position; and
   (c) torque applying means for converting a force generated by the movement of said moving means into a torque and applying the torque to said first half of said holding means.

2. A disk cramp apparatus of claim 1, wherein said moving means includes a rack for executing a translational movement of said moving means, said torque applying means includes a ring gear attached to said first half of said holding means and in engagement with said rack, and during the movement of said moving means said first half of said holding means is rotated by said ring gear in engagement with said rack.

3. A disk cramp apparatus of claim 1, wherein said moving means includes at one end a push button so that manual pushing said button causes said moving means to move in a predetermined direction.

4. A disk cramp apparatus of claim 2, wherein said moving means includes at one end a push button so that manual pushing said button causes said moving means to move in a predetermined direction.

5. A disk cramp apparatus comprising:
   (a) a spindle hub for supporting a disk having a central opening at the portion of said disk extending along the outer periphery of said opening, said hub having a recess corresponding to the disk opening;
   (b) a collet having a convexity in the form of a substantially truncated cone for insertion into the opening in said disk and said recess in said spindle hub;
   (c) a cam for moving said collet to insert a disk between said spindle hub and said collet;
   (d) a first gear for transmitting a torque to said spindle hub; and
   (e) a second gear meshed with said first gear for rotating said first gear in response to the movement of said cam.

6. A disk cramp apparatus of claim 5, wherein said first gear includes a ring gear, and said second gear includes a rack.

7. A disk cramp apparatus of claim 5, further including a transmission member for transmitting a force to said second gear to move said cam.

8. A disk cramp apparatus of claim 6, further including a transmission member for transmitting a force to said rack to move said cam.

* * * * *